United States Patent [19]
Herrbrich

[11] 3,713,332
[45] Jan. 30, 1973

[54] APPARATUS FOR THE AUTOMATIC OPERATION OF OPERATING DEVICES FOR MOTOR VEHICLES

[75] Inventor: Bernd Herrbrich, 7000 Stuttgart-Stammheim, Germany

[73] Assignee: Firma Dr. Ing. h. c. F. Porsche KG, Stuttgart-Zuffenhause, Germany

[22] Filed: Feb. 4, 1971

[21] Appl. No.: 112,672

[30] Foreign Application Priority Data

Feb. 4, 1970 Germany.....................P 20 04 979.0

[52] U.S. Cl..................................73/117, 73/132
[51] Int. Cl..................................G01l 5/13
[58] Field of Search.......................73/117, 132

[56] References Cited

UNITED STATES PATENTS 3,516,287   6/1970   Masuda et al.........................73/117
3,439,534   4/1969   Pilgrim................................73/117

*Primary Examiner*—Jerry W. Myracle
*Attorney*—Craig, Antonelli, Stewart & Hill

[57] ABSTRACT

An apparatus for the automatic operation of operating devices of vehicles, especially motor vehicles, in dependence on a program distributor apparatus for simulating plotted driving programs through the use of a roller test stand, wherein the individual operating devices of the vehicle such as the gas pedal, brake pedal, clutch and gear-shifting lever are connectable with servo-motors having control mechanisms operable by means of the program-distributor apparatus. A common base frame arranged opposite to the operating devices in the passenger compartment of the vehicle and to which the program distributor apparatus, the control mechanisms and the servo-motors are fastened. The servo-motors are connected to the operating devices by quick-connectors.

8 Claims, 2 Drawing Figures

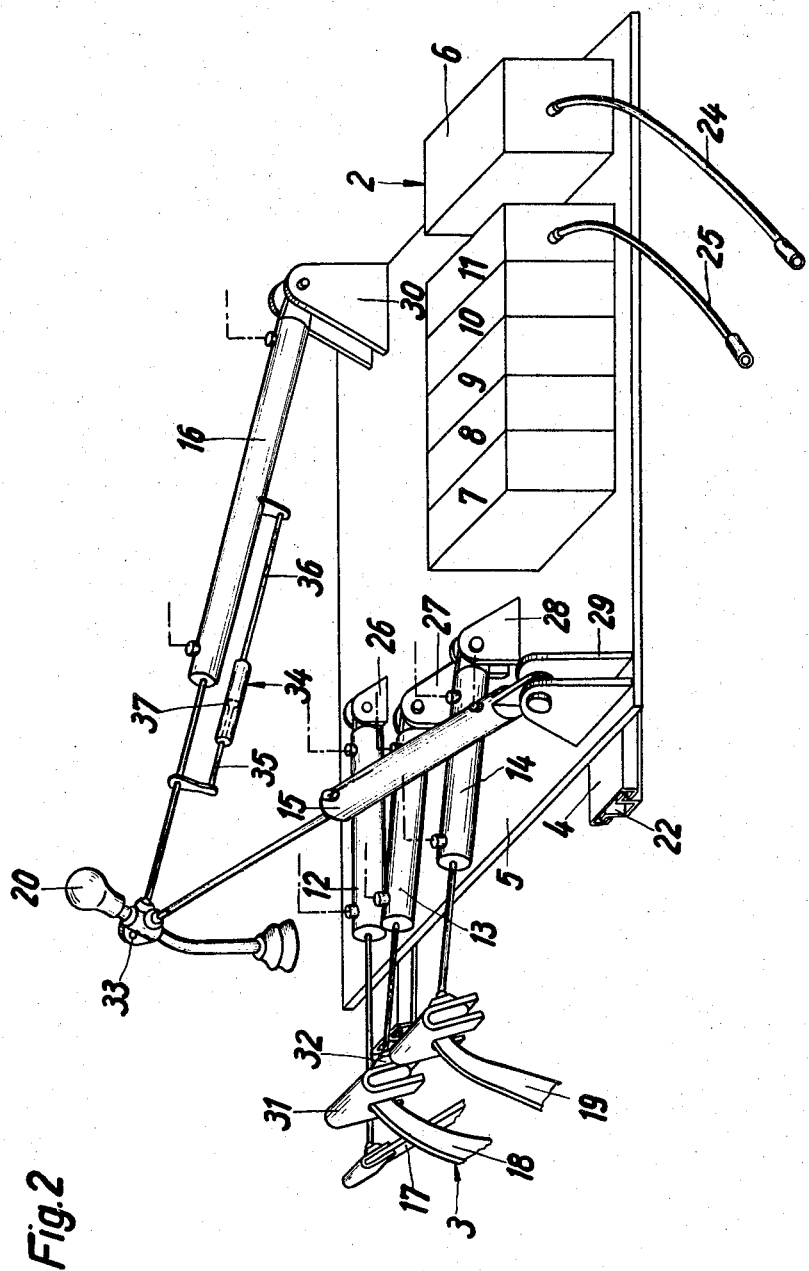

APPARATUS FOR THE AUTOMATIC OPERATION OF OPERATING DEVICES FOR MOTOR VEHICLES

BACKGROUND OF THE INVENTION

The present invention relates to an apparatus for the automatic operation of operating devices for vehicles, especially motor vehicles, in dependence upon a program-distributor apparatus for simulating plotted driving programs through the utilization of a roller test stand. More particularly, the present invention relates to an apparatus in which the individual operating members of the motor vehicle such as, for example, the acceleration or gas pedal, the deceleration or brake pedal and the speed shifting pedal or clutch are connected with servo-motors having control mechanisms operatively associated with and influenced by the program-distributor apparatus.

In an attempt to simplify motor vehicle test driving, a number of test installations have already been developed by which extended or time consuming driving tests may be rationalized in such a manner that they are deformed with requiring a tremendous amount of time as well as much personnel. Test installations of this type essentially consist of a program-controlled test stand onto which the most essential control devices, at least those of the internal combustion engine, are connected and adjusted in accordance with a plotted test program such that variable operating conditions may be initiated.

The test installation includes a conventional roller test stand and, for example, a device for automatically plotting operation data for the analysis of the exhaust gases. Such test installations as described, for example, in the Journal "Automatic" of March 1968 at pages 96–97 are complicated as well as expensive and, in addition, require highly trained technical personnel for the operation of the vehicle. Routine supervision for bringing motor vehicles into service must, therefore, be carried out with highly technical personnel and high costs.

In order to avoid building an individual test installation for each of the numerous driving programs prescribed by law and in order to be able to carry out various driving programs consecutively, if required, the conventional control apparatuses have been equipped with devices making it possible to transfer driving programs plotted by the data carrier into shifting control motions. Installations of the aforementioned type are described in the Journal "Automisierung" of April 1968 at pages 12–18. In such control installations, the assigned servo-motors for the transfer of shifting and control motions are positively connected with the control devices of the engine and the gear shift, whereby additional means are required at the driving aggregate at the vehicle. These test installations are, however, not suitable for the continuous supervision of new vehicles to be brought into service or motor vehicles which are in service.

SUMMARY OF THE INVENTION

It is the aim of the present invention to overcome the problems and disadvantages encountered in the prior art devices.

It is also an aim of the present invention to accomplish a simplification of test runs, for example, the execution of legally prescribed test programs for motor vehicles.

More specifically, the present invention has as its objective the creation of a device for reproducing various operating or driving conditions of vehicles, which device may be mounted into vehicles without extensive technical effort and with small time requirements as a substitute for the driver. It is also an objective of the present invention to complete the necessary test runs without additional personnel for the prescribed operation of the vehicle.

The foregoing problems have been solved and the aims achieved in accordance with the present invention by providing a distributor and control apparatus serving to reproduce the program and including the servo-motors and their supports mounted on a common base which is arranged in the passenger compartment of the vehicle in relation to the operating devices. In accordance with the present invention, the distributor and control apparatuses are mounted in such a way that the servo-motors may be connected to the operating devices by means of quick-connectors.

In accordance with an advantageous feature of the present invention, the common base is provided with guide rails and is fastened exchangeably with the drivers seat in the passenger compartment opposite to or facing the operating devices. The base may be advantageously secured in the seat guide rails by means of the arresting device associated with the drivers set opposite to the operating devices.

According to a further feature of the present invention, the servo-motors are preferably constructed as double-acting pneumatic cylinders being pivotable at one end thereof about a horizontal axis at the base and provided at the other end with quick-connectors which encompass, at least partially, the operating devices of the motor vehicle. Two working cylinders are each associated with the brake, clutch and gas pedals extending in the direction of travel and two cylinders are arranged at right angles to each other at the gear-shift lever or stick. Further, a linkage is associated with each working cylinder and is connected, in part, at the piston rod and, in part, on its cylinder which is provided with electrical control elements and serves as a feed-back device for the program distributor apparatus.

By means of the features in accordance with the present invention, a simple and easy-to-handle device is created, thereby making it possible to complete simulated operating processes, as well as arbitrary driving programs on a conventional roller test stand, whereby a person for driving the vehicle is not required. Due to the fact that the base supporting the control elements is exchangeable with the drivers seat, a very simple support and arresting means is obtained so that additional means in the vehicle are not required. As a further advantage of the present invention, it should also be mentioned that the feed-back device which is arranged at each servo-motor assures an automatically acting supervision of the device, whereby it may operate without having to provide any measuring or control device outside of the vehicle.

BRIEF DESCRIPTION OF THE DRAWING

These and further features, aims and advantages of the present invention will become more apparent from the following description when taken in conjunction with the accompanying drawing which shows, for purposes of illustration only, an embodiment in accordance with the present invention and wherein:

FIG. 2 is a perspective view of the automatic operating device for the motor vehicle according to FIG. 1 but on an enlarged scale.

DETAILED DESCRIPTION OF THE DRAWING

Figure 1:
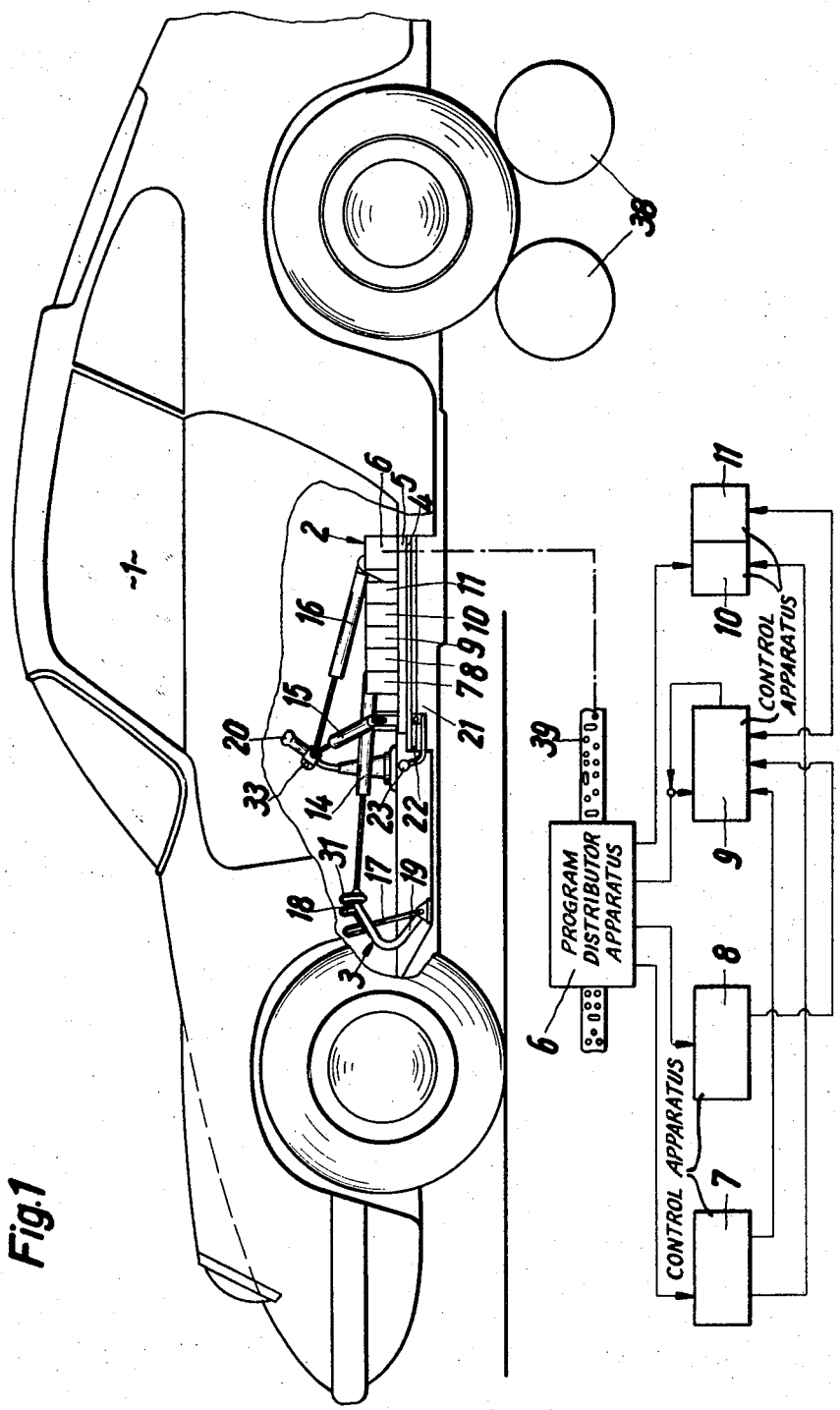
FIG. 1 is a partial cut-away view of a motor vehicle held on a roller test stand including the automatic operating device in accordance with the present invention.

Referring now to the drawing and, in particular, to FIG. 1, a passenger compartment 1 of a motor vehicle has an apparatus 2 therein for the automatic operation of the operating devices of the motor vehicle, which apparatus is arranged in place of the driver seat 2. The apparatus 2 includes a base 5 provided with guide rails 4, an electronic program distributor apparatus 6 which is arranged on the base 5 and has control instruments 7, 8, 9, 10 and 11 as well as double-acting working cylinders 12, 13, 14, 15, 16 for the operation of the gas pedal 17, the brake pedal 18, the clutch pedal 19 and the gear-shift lever 20. The guide rails 4 are arranged at the underside of the base 5 and are matched in their profile with the seat guide rails 22 fastened to the vehicle floor 21. An arresting device 23 associated with the driver seat (not shown) secures the position of the base 5 against the operating pedals 17, 18, 19 and the gear-shift lever 20.

The electronic program distributor apparatus 6 and the control apparatuses 7 to 11 operably by the apparatus 6 are mounted on the base 5 and are each provided with electrical current and compressed air through supply lines 24 and 25, respectively, from an energy source outside of the vehicle. The energy supply may also be obtained, however, from the vehicle itself when, for example, it is provided with an air pressure pump as is usually the case for trucks. The control apparatuses 7 to 11 are provided with conventional control valves which are released electrically from the program distributor apparatus 6 in order to operate the working cylinders 12 to 16 associated with the operating devices 17 to 20 corresponding to the transmitted control impulses. The working cylinders 12 to 16 are arranged essentially in the direction of travel and are pivotally arranged at the base 5 by means of supports 26, 27, 28, 29, 30.

The working cylinders 15 and 16 associated with the operation of the gear-shift lever 20 are arranged substantially perpendicular to each other, whereby one of the working cylinders 16 extends parallel to the direction of travel while the other working cylinder 16 extends perpendicular thereto. The piston rods of the working cylinders 12, 13, 14 are connected with the operating pedals 17, 18, 19 by means of quick-connectors 31 which include a movable connecting hinge 32. The piston rods of the working cylinders 15 and 16 associated with the gear-shift lever 20 are angularly movable and pivotally arranged on a common, easily removable connector 33 which is hingedly fastened at the shaft of the shift lever 20.

An electric feed-back device 34 is associated with each of the double-acting work cylinders 12 to 16. The feed-back device 34, of which only one is shown, consists in a known manner of link parts 35, 36 with electric control elements 37 inserted between the piston rod and the cylinder and movable one in relation to the other. The control element 37 is connected to the program distributor apparatus 6 which gives the control the respective operating orders.

For testing the vehicle on the roller test stand 38, the driver seat is removed so that the automatic operating apparatus 2 may be placed onto the seat guide rails 22 by means of the guide rails 4 on the base frame 5 and so as to be held by means of the arresting device 23 at a predetermined distance in relation to the operating devices 17 to 20 of the vehicle. Subsequent to insertion of the base frame 5 into the passenger compartment, the working cylinders 12, 13, 14 are connected with the operating pedals 17, 18, 19 by means of the quick-connectors 31 provided therefor. Further, the working cylinders 15, 16 are connected to the gear-shift lever 20 with the aid of the connector 33. By this simple arrangement, the automatic operating devices are connected to the vehicle and may be put into operation after connection of the energy source lines 24 and 25. To be placed into operation, the engine of the vehicle is started in the usual manner. Through this, the program distributor apparatus 6 and, at the same time, a perforated tape 39 on which the desired driving program is stored are put into operation. The scanned electrical impulses are fed to the individual control apparatus 7 to 11 according to the schematic diagram in FIG. 1. The working cylinders 12 to 16 will then execute the adjusting movements in a fixed operating direction which correspond to the driving program in dependence upon the scanned impulses, the duration of which may be varied. For putting the vehicle into operation, the clutch pedal 19 is, for example, first operated and thereby the desired gear-shift step is performed with the help of the gear-shift lever 20. The vehicle may thereafter be accelerated with the help of the gas pedal 17 and according to the predetermined driving plan. Braking the vehicle to a stop is possible with the aid of the brake pedal 18. The feed-back device of the working cylinder 13 timely releases a control impulse through which the shift lever 20 is guided into the neutral position. Execution of each control movement is reported to the program distributor apparatus 6 through the individual feed-back devices 34 so that the automatic control is given and is the reason why the use of special control devices are not necessary in the arrangement of the present invention. After completing the test, the above-described test apparatus may be removed from the vehicle and the regular driver seat reinstalled.

Although I have shown and described an embodiment in accordance with the present invention, it is to be clearly understood that the same is susceptible of numerous changes and modifications as will be apparent to one skilled in the art. For example, a hydraulic or electrical positioning device could also be used in place of the above-described pneumatic positioning devices. I, therefore, do not wish to be limited to the details shown and described herein, but intend to cover all such changes and modifications as are encompassed within the scope of the present invention.

I claim:

1. An apparatus for the automatic operation of operating devices of a vehicle arranged on a roller test stand, especially a motor vehicle, the operating devices being automatically operated in dependence upon simulated driving programs, the apparatus comprising programmed distributor means for simulating prepared driving programs, servo-motor means being operatively connected with individual operating devices of the vehicle, control apparatuses operable from the program distributor means for controlling the servo-motor means, the program distributor means, the control apparatuses and the servo-motor means being mounted on a common base frame arranged facing the operating devices in the passenger compartment of the vehicle, guide rail means being provided at the base frame for being exchangeable with the driver seat in the passenger compartment facing the operating devices, and quick-connector means being provided for connecting the servo-motor means to the operating devices.

2. Apparatus according to claim 1, wherein the operating devices include a gas pedal, a brake pedal, a clutch and a gear-shifting lever.

3. Apparatus according to claim 1, wherein support means are provided for pivotally mounting the servo-motor means at the common base frame.

4. Apparatus according to claim 1, wherein arresting means is provided for adjustability of the base frame in seat guide rail means in the passenger compartment, said arresting means being connectable with the driver seat facing the operating devices.

5. Apparatus according to claim 1, wherein the servo-motor means include a plurality of pressure-medium cylinders pivotally arranged at one end thereof about a horizontal axis at the base frame and at the other end being provided with a piston rod attached in a joint-like manner with the quick-connector means which encompass, at least in part, the operating devices.

6. Apparatus according to claim 5, wherein one cylinder extends in the longitudinal direction of the vehicle and is operatively connected with each of a brake pedal, gas pedal and clutch, and two of the cylinders are operatively connected with a gear shift lever and are arranged substantially perpendicular to each other.

7. Apparatus according to claim 5, wherein linkage means is operatively connected with the cylinders and connected, in part, at the piston rod and, in part, at the respective cylinder, said linkage means being provided with electrical control means for providing feed-back to the program distributor means.

8. Apparatus according to claim 7, wherein one cylinder extends in the longitudinal direction of the vehicle and is operatively connected with each of a brake pedal, gas pedal and clutch, and two of the cylinders are operatively connected with a gear shift lever and are arranged substantially perpendicular to each other.

* * * * *